United States Patent
Kawai et al.

(10) Patent No.: US 11,009,066 B2
(45) Date of Patent: May 18, 2021

(54) DOUBLE-ROW FOUR-POINT CONTACT BALL BEARING

(71) Applicant: NACHI-FUJIKOSHI CORP, Tokyo (JP)

(72) Inventors: Toshihiro Kawai, Toyama (JP); Takao Terada, Toyama (JP)

(73) Assignee: NACHI-FUJIKOSHI CORP., Tokyo (JP)

( * ) Notice: Subject to any disclaimer, the term of this patent is extended or adjusted under 35 U.S.C. 154(b) by 0 days.

(21) Appl. No.: 16/618,392

(22) PCT Filed: Feb. 1, 2018

(86) PCT No.: PCT/JP2018/003401
§ 371 (c)(1),
(2) Date: Dec. 1, 2019

(87) PCT Pub. No.: WO2018/220899
PCT Pub. Date: Dec. 6, 2018

(65) Prior Publication Data
US 2020/0182291 A1    Jun. 11, 2020

(30) Foreign Application Priority Data
Jun. 2, 2017   (JP) .............................. JP2017-110060

(51) Int. Cl.
*F16C 19/18*     (2006.01)
*F16C 19/16*     (2006.01)
(52) U.S. Cl.
CPC .......... *F16C 19/183* (2013.01); *F16C 19/166* (2013.01); *F16C 2240/34* (2013.01); *F16C 2240/80* (2013.01)

(58) Field of Classification Search
CPC .... F16C 19/166; F16C 19/181; F16C 19/182; F16C 19/183; F16C 19/184
See application file for complete search history.

(56) References Cited

U.S. PATENT DOCUMENTS 1,430,319 A    9/1922  Parker
6,827,496 B2 *  12/2004  Iwata ................... F16C 33/585
                                            384/516

(Continued)

FOREIGN PATENT DOCUMENTS

CN    102057172 A     5/2011
JP    2003049848 A  *  2/2003  ............ F16C 33/585

(Continued)

OTHER PUBLICATIONS

International Search Report for International Application No. PCT/JP2018/003401 dated Apr. 10, 2018.

(Continued)

*Primary Examiner* — Phillip A Johnson
(74) *Attorney, Agent, or Firm* — Venkatesh Krishnamoorthy; Silicon Valley Patent Group, LLP

(57) ABSTRACT

A double-row four-point contact ball bearing 100 according to the present invention includes an outer ring 102, an inner ring 104, and balls 106 and 108 that are arranged in two rows between the outer ring 102 and the inner ring 104 and each have four contact points. Inner side contact angles α of the balls 106 and 108 arranged in the two rows are set such that lines of action L1 and L2 that extend respectively connecting center points of the balls 106 and 108 and contact points of the balls do not cross each other in the outer ring 102.

1 Claim, 2 Drawing Sheets

(56) References Cited

U.S. PATENT DOCUMENTS

| | | | |
|---|---|---|---|
| 9,541,126 B2* | 1/2017 | Jepsen | F16C 33/583 |
| 2006/0171622 A1* | 8/2006 | Ohata | F04B 27/1063 |
| | | | 384/513 |
| 2009/0129713 A1* | 5/2009 | Hattori | B25J 9/108 |
| | | | 384/462 |
| 2011/0085756 A1 | 4/2011 | Hori et al. | |
| 2012/0283965 A1 | 11/2012 | Hori et al. | |
| 2015/0043858 A1 | 2/2015 | Aust et al. | |
| 2018/0193890 A1* | 7/2018 | Kern | F16C 13/006 |

FOREIGN PATENT DOCUMENTS

| | | |
|---|---|---|
| JP | 2005-172146 A | 6/2005 |
| JP | 2006-177504 A | 7/2006 |
| JP | 2008-115955 A | 5/2008 |
| JP | 2009-204122 A | 9/2009 |
| JP | 2010-281352 A | 12/2010 |
| JP | 2015-045415 A | 3/2015 |
| KR | 2011-0015643 A | 2/2011 |
| KR | 10-2012-0113227 | 10/2012 |
| WO | WO-2009/147865 A1 | 12/2009 |
| WO | WO-2014/180669 A1 | 11/2014 |

OTHER PUBLICATIONS

Supplemental European Search Report for European Application No. 18808844.7 dated Jul. 17, 2020.
Office Action for Korean Application No. 10-2017-0130376 dated Apr. 1, 2019.
Office Action for Japanese Application No. 2017-110060 dated Jan. 29, 2019.
Written Opinion for Japanese Application No. 2017-110060 dated Mar. 26, 2019.
Office Action for Japanese Application No. 2017-110060 dated Sep. 3, 2019.
Written Opinion for Japanese Application No. 2017-110060 dated Oct. 29, 2019.
Office Action for Japanese Application No. 2017-110060 dated Jan. 7, 2020.

* cited by examiner (a)

|  | P | D | PCD | α | P > (D−PCD)/2 × tan α × 2 |
|---|---|---|---|---|---|
| Embodiment Example | 8.4 | 92 | 76 | 20 | ○<br>8.4 > 5.8 |
| Comparative Example | 8.4 | 92 | 76 | 30 | ×<br>8.4 > 9.2 |

(b)

Embodiment Example  Comparative Example (c)

DOUBLE-ROW FOUR-POINT CONTACT BALL BEARING

CROSS-REFERENCE TO RELATED APPLICATIONS

This application is a National Stage Application, under 35 U.S.C. § 371, of International Application No. PCT/JP2018/003401, filed Feb. 1, 2018, which claims priority to Japanese Patent Application No. 2017-110060 filed Jun. 2, 2017. The above-identified applications are incorporated by reference herein in their entireties.

TECHNICAL FIELD

The present invention relates to a double-row four-point contact ball bearing.

BACKGROUND

Tapered roller bearings that have high rigidity have been conventionally used in portions of vehicles, machines, etc. that are exposed to a relatively large load, such as a pinion shaft of a differential gear (final reduction gear) of an automobile. Since the rotating torque of a tapered roller bearing is large, recent years have seen many cases where ball bearings with improved rigidity are used instead of tapered roller bearings to reduce loss. For example, in Patent Document 1, the applicant of the present invention proposed a double-row four-point contact ball bearing that is capable of effectively taking on a radial load and an axial load.

RELATED DOCUMENTS

Patent Document 1: JP 2005-172146A

PROBLEMS TO BE SOLVED BY THE INVENTION

In the above-described ball bearing, the area of contact between a bearing ring and a rolling element is small compared to that of tapered roller bearings, and therefore the bearing ring is likely to elastically deform. Here, a phenomenon termed as creep may occur, for example, as a result of elastic deformation of an outer ring. When an outer ring is inserted into a housing or the like of an apparatus and rotation is caused, the outer ring may deform, for example, as a result of being traced by a ball continuously. The deformation of the outer ring may cause the outer ring to rotate within the housing.

Creep causes abrasion of the housing and abrasion powder generated from the housing causes early damage to the bearing, and also creep increases backlash and causes noise and vibration. Therefore, there are demands for suppressing deformation of the outer ring in order to prevent creep. For example, increasing the thickness of the outer ring in order to suppress deformation of the outer ring is known. However, if the thickness of the outer ring is merely increased, there arises a problem that dimensions of external configurations such as the housing are also increased.

In view of the above problem, the object of the present invention is to provide a double-row four-point contact ball bearing in which deformation of a bearing ring can be suppressed while suppressing an increase in dimensions.

SUMMARY

In order to solve the above problem, a representative configuration of a double-row four-point contact ball bearing according to the present invention includes an outer ring, an inner ring, and balls that are arranged in two rows between the outer ring and the inner ring and each have four contact points, wherein inner side contact angles of the balls arranged in the two rows are set such that lines of action that extend respectively connecting center points of the balls and contact points of the balls do not cross each other in the outer ring or the inner ring.

According to this configuration, the lines of action of the balls arranged in the two rows are dispersed so as not to cross each other in the outer ring or the inner ring, and therefore a load can also be dispersed. As a result, deformation of a bearing ring can be suppressed without relying on increasing the thickness or the like, and elastic deformation of the outer ring or the inner ring can be favorably suppressed.

In the double-row four-point contact ball bearing, when P represents a distance in an axial direction between centers of the balls arranged in the two rows, D represents an outer diameter of the outer ring, PCD represents a pitch circle diameter of the balls arranged in the two rows, and a represents inner side contact angles on the outer ring side of the balls arranged in the two rows, the following relationship is satisfied $P > (D-PCD)/2 \times \tan a \times 2$.

According to this configuration, the lines of action of the balls arranged in the two rows can be dispersed so as not to cross each other on the outer ring side, and therefore a load can also be dispersed. As a result, deformation of the outer ring can be suppressed without relying on increasing the thickness or the like, and elastic deformation of the outer ring can be favorably suppressed.

Effects of the Invention

According to the present invention, it is possible to provide a double-row four-point contact ball bearing in which deformation of an outer ring can be suppressed while suppressing an increase in dimensions.

INDEX TO THE REFERENCE NUMERALS

Figure 1:
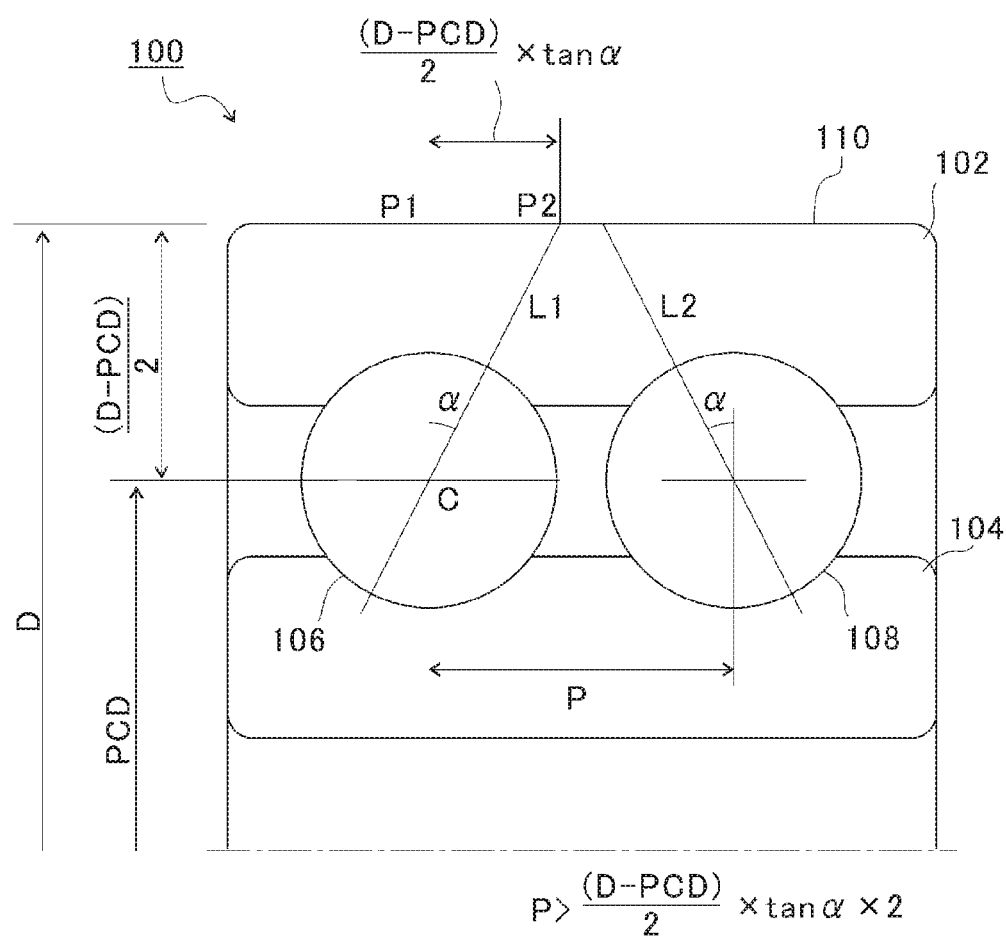
FIG. 1 is a diagram showing a double-row four-point contact ball bearing according to an embodiment of the present invention in an enlarged scale.

An index to the reference numerals used in the description follows:

100 . . . double-row four-point contact ball bearing;
102 . . . outer ring;
104 . . . inner ring;
106 . . . ball;
108 . . . ball;
110 . . . outer surface

DETAILED DESCRIPTION

The following describes an embodiment of the present invention with reference to the accompanying drawings. Dimensions, materials, other specific numerical values, and the like described in the embodiment are merely examples to facilitate understanding of the invention, and do not limit the present invention unless otherwise stated. It should be noted that elements that have substantially the same function and configuration are denoted with the same reference signs in the specification and drawings and repetitive description of these elements is omitted. Further, illustration or description of elements that do not directly relate to the present invention is omitted.

FIG. 1 is a diagram showing a double-row four-point contact ball bearing 100 according to an embodiment of the present invention in an enlarged scale. As shown in FIG. 1, the double-row four-point contact ball bearing 100 includes an outer ring 102 and an inner ring 104, which are bearing rings, and balls 106 and 108 that are arranged in two rows between the outer ring 102 and the inner ring 104 and each have four contact points.

Disclosed embodiments of the double-row four-point contact ball bearing 100 include measures for suppressing deformation of the bearing rings while suppressing an increase in the overall dimensions. The double-row four-point contact ball bearing 100 is used, for example, in a state where the outer ring 102 is inserted into a housing or the like of an apparatus. In this case, in conventional systems, if the thickness of the outer ring 102 is such that the outer ring 102 may elastically deform, then the creep phenomenon may occur. Therefore, in some embodiments disclosed herein, in the double-row four-point contact ball bearing 100, inner side lines of action L1 and L2 of the balls 106 and 108 on the outer ring 102 side are dispersed so as not to cross each other, so that, if an external load is applied to the outer ring 102, the external load can be dispersed.

The following describes detailed conditions for dispersing the lines of action L1 and L2 in the outer ring 102. First, the lines of action L1 and L2 are lines that extend respectively connecting the center points (for example, center point C) of the balls 106 and 108 and contact points of the balls. In this embodiment, the balls 106 and 108 arranged in the two rows each have an inner side contact angle $\alpha$ on the outer ring 102 side, and the contact angle $\alpha$ is set such that the line of action L1 and the line of action L2 do not cross each other in the outer ring.

P represents the distance between the centers of the balls 106 and 108 in the axial direction. P1 represents the point of intersection between a line extending in the radial direction from the center point C of the ball 106 and an outer surface 110 of the outer ring 102, and P2 represents the point of intersection between the line of action L1 or L2 extending from an inner side contact point of the ball 106 or 108 and the outer surface 110 of the outer ring 102. In order to disperse the lines of action L1 and L2 so that they do not cross each other, the distance from the point P1 to the point P2 is set to P/2 or less. This condition of the distance from P1 to P2 will be expressed using a mathematical formula below.

D represents the outer diameter of the outer ring 102, and PCD represents the pitch circle diameter of the ball 106. FIG. 1 shows half (½) of the entire cross section of the double-row four-point contact ball bearing 100. Based on the above, the distance from the center point C of the ball 106 to the point P1 can be expressed using Formula 1 below.

Distance from center point $C$ to point $P1=(D-PCD)/2$  Formula 1

Using above Formula 1 and the contact angle $\alpha$, the distance from the point P1 to the point P2 can be expressed using Formula 2 below.

Distance from point $P1$ to point $P2=(D-PCD)/2\times\tan\alpha$  Formula 2

As described above, in order to disperse the lines of action L1 and L2 so that they do not cross each other, the distance from the point P1 to the point P2 needs to be set to P/2 or less. Above Formula 2 being P/2 or less can be expressed using Formula 3 below.

$P>(D-PCD)/2\times\tan\alpha\times2$  Formula 3

If the relationship of above Formula 3 is satisfied, dispersion of the lines of action L1 and L2 in the outer ring 102 can be realized. If the outer ring 102 is embodied such that the condition expressed using above Formula 3 is satisfied, the lines of action L1 and L2 of the balls 106 and 108 arranged in the two rows are dispersed without crossing each other on the outer ring 102 side. As a result, an external load applied to the outer ring 102 can be dispersed to prevent local concentration of the load. As described above, the condition expressed using above Formula 3 makes it possible to favorably suppress elastic deformation of the outer ring 102 without relying on increasing the thickness or the like.

Figure 2:
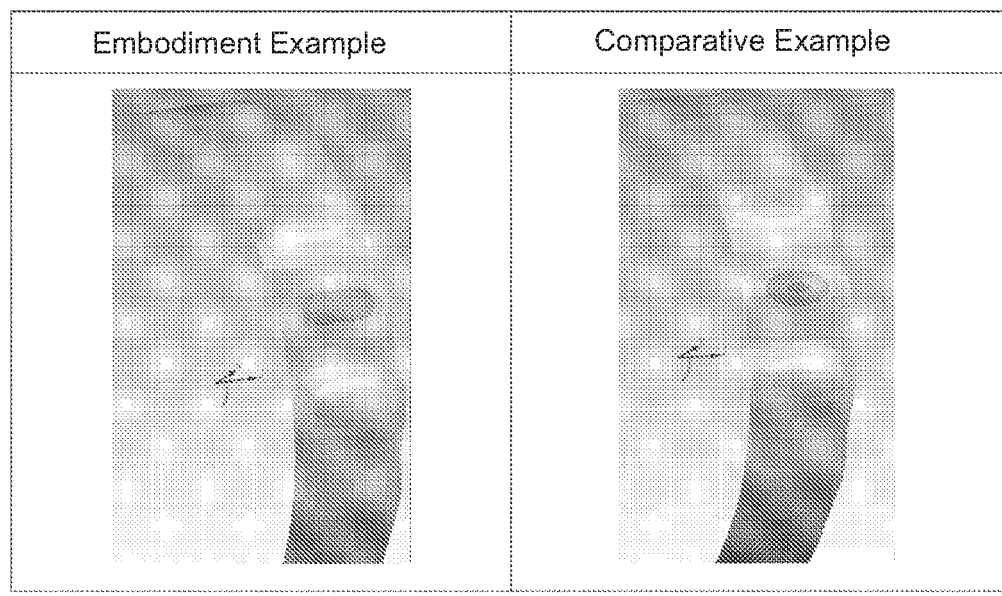
FIG. 2 is a diagram for explaining effects of the present invention.
Figure 2:
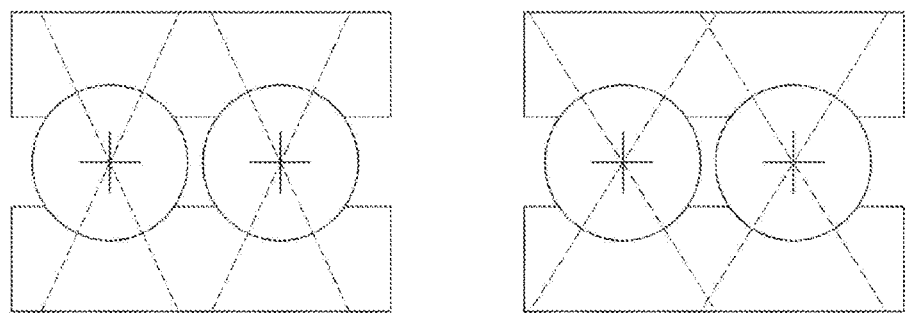

FIG. 2 shows diagrams for explaining the effects of the invention. FIG. 2(a) shows analysis results of the amount of deformation of the outer ring for an embodiment example and a comparative example, and FIG. 2(b) shows corresponding dimensions of analyzed objects. The analysis results in FIG. 2(a) only show outer diameter surfaces of outer rings, and the deformation ratio is shown in an enlarged scale. It can be confirmed from the analysis results shown in FIG. 2(a) that, in the embodiment example, the range of deformation is wider and the maximum deformation amount is smaller than those in the comparative example. On the other hand, in the comparative example, the range of deformation is narrower and the maximum deformation amount is larger than those in the example.

Differences in dimensions between the embodiment example (Top Row) and the comparative example (Bottom Row) will be described with reference to FIG. 2(b). The items shown in the top row in FIG. 2(b) correspond to the dimensions shown for the embodiment example in FIG. 1. From left to right, P represents the distance in the axial direction between centers of balls arranged in two rows, D represents the outer diameter of the outer ring, PCD represents the pitch circle diameter of the balls, and $\alpha$ represents the inner side contact angle on the outer ring side of the balls arranged in the two rows. Results obtained by substituting values of these items into above Formula 3 ($P>(D-PCD)/2\times\tan\alpha\times2$) are shown in the right end column. It should be noted that the unit of each distance is mm.

A major difference between the embodiment example and the comparative example is that the contact angle $\alpha$ is set to 20° in the embodiment example and 30° in the comparative example. As a result, in the embodiment example, the right side of Formula 3 shown in the right end column is 5.8 mm, which is not greater than P (distance between the centers of the balls of 8.4 mm) on the left side (8.4>5.8), so that the relationship of Formula 3 is satisfied. On the other hand, in the comparative example, the right side of Formula 3 is 9.2 mm, which is greater than P (distance between the centers of the balls of 8.4 mm) on the left side (8.4>9.2), thus, the relationship of Formula 3 is not satisfied.

FIG. 2(c) is a schematic diagram showing cross sections in the embodiment example and the comparative example. In the embodiment example, the lines of action are dispersed in the outer ring as a result of the relationship of above Formula 3 being satisfied. On the other hand, in the comparative example, the lines of action overlap in the outer ring as a result of the relationship of Formula 3 not being satisfied.

As a result of the above, in the analysis results shown in FIG. 2(a), the range of deformation is wide and the maximum deformation amount is small in the embodiment example. In contrast, the range of deformation is narrow and the maximum deformation amount is large in the comparative example. These results show that deformation of the outer ring is suppressed in the embodiment example, and therefore the creep phenomenon is unlikely to occur.

In the embodiment, the lines of action L1 and L2 are dispersed so as not to cross each other in the outer ring 102 (see FIG. 1) to suppress deformation of the outer ring 102. At this time, the contact angles of the balls 106 and 108 may be set to different angles from each other, if the lines of action L1 and L2 can be dispersed. Furthermore, deformation of the inner ring 104 can also be suppressed based on the same technical idea. For example, on the inner ring 104 side, inner side contact angles of the balls 106 and 108 arranged in the two rows are set such that lines of action of the respective balls do not cross each other in the inner ring 104. With this configuration, an external load applied to the inner ring 104 can also be dispersed and elastic deformation of the inner ring can be favorably suppressed without relying on increasing the thickness or the like.

Although one embodiment of the present invention has been described with reference to the drawings, it should be understood that the present invention is not limited to this embodiment. A person skilled in the art will appreciate that various variations and modifications can be arrived at within the scope of the appended claims, and those variations and modifications should be understood to be included within the technical scope of the present invention.

INDUSTRIAL APPLICABILITY

The present invention can be applied to double-row four-point contact ball bearings.

What is claimed is:

1. A double-row four-point contact ball bearing comprising:
   an outer ring with an outer diameter D,
   an inner ring, and
   balls that are arranged in two rows between the outer ring and the inner ring, each ball with four contact points, and with a pitch circle diameter PCD,
   wherein inner side contact angles $\alpha$ on the outer ring side of the balls arranged in the two rows are set such that lines of action that extend respectively connecting center points of the balls and contact points of the balls do not cross each other in the outer ring or the inner ring and the relationship $P > (D-PCD)/2 \times \tan \alpha \times 2$ is satisfied.

* * * * *